US008870385B2

(12) United States Patent
Oka

(10) Patent No.: US 8,870,385 B2
(45) Date of Patent: Oct. 28, 2014

(54) DISPLAY SYSTEM

(75) Inventor: Nobuhiro Oka, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 375 days.

(21) Appl. No.: 13/175,583

(22) Filed: Jul. 1, 2011

(65) Prior Publication Data

US 2012/0008101 A1 Jan. 12, 2012

(30) Foreign Application Priority Data

Jul. 6, 2010 (JP) ................... 2010-154321

(51) Int. Cl.
*G03B 21/14* (2006.01)
*H04N 9/31* (2006.01)
*H04N 5/232* (2006.01)
*H04N 21/41* (2011.01)

(52) U.S. Cl.
CPC ............ *G03B 21/147* (2013.01); *H04N 9/3185* (2013.01); *H04N 5/23293* (2013.01); *H04N 21/4122* (2013.01)
USPC ........................................... 353/69; 715/273

(58) Field of Classification Search
USPC ............... 353/69, 70; 715/273, 709
See application file for complete search history.

(56) References Cited

U.S. PATENT DOCUMENTS

| 7,001,024 | B2* | 2/2006 | Kitaguchi et al. ............. 353/70 |
| 7,607,783 | B2* | 10/2009 | Sakurai et al. .................. 353/70 |
| 7,633,654 | B2* | 12/2009 | Morichika ..................... 358/474 |
| 2005/0163396 | A1* | 7/2005 | Morichika et al. ............ 382/275 |
| 2011/0292347 | A1* | 12/2011 | Zhang et al. .................... 353/28 |

FOREIGN PATENT DOCUMENTS

| JP | 2000-081593 A | 3/2000 |
| JP | 2010-016552 A | 1/2010 |

* cited by examiner

*Primary Examiner* — William C Dowling
(74) *Attorney, Agent, or Firm* — Canon U.S.A., Inc. IP Division

(57) ABSTRACT

A projection apparatus for projecting an input image onto the projection surface includes a correction unit configured to correct distortion of an image to be displayed on the projection surface, a projection unit configured to project an image corrected by the correction unit, a communication unit configured to communicate with an external imaging apparatus, and a control unit configured to control the correction unit, wherein the control unit transmits distortion information concerning distortion of an image to be displayed on the projection surface to the imaging apparatus via the communication unit.

6 Claims, 8 Drawing Sheets

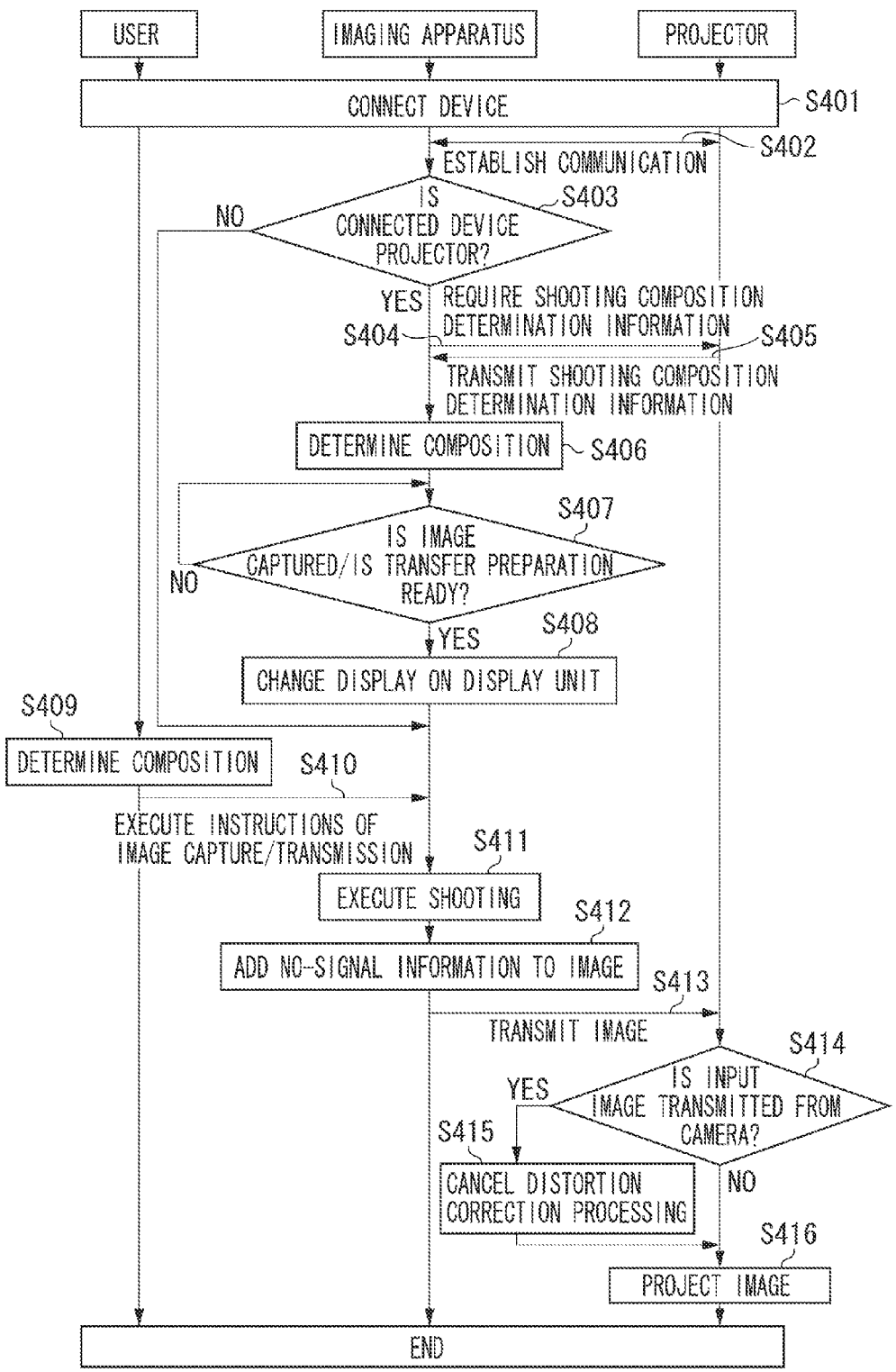

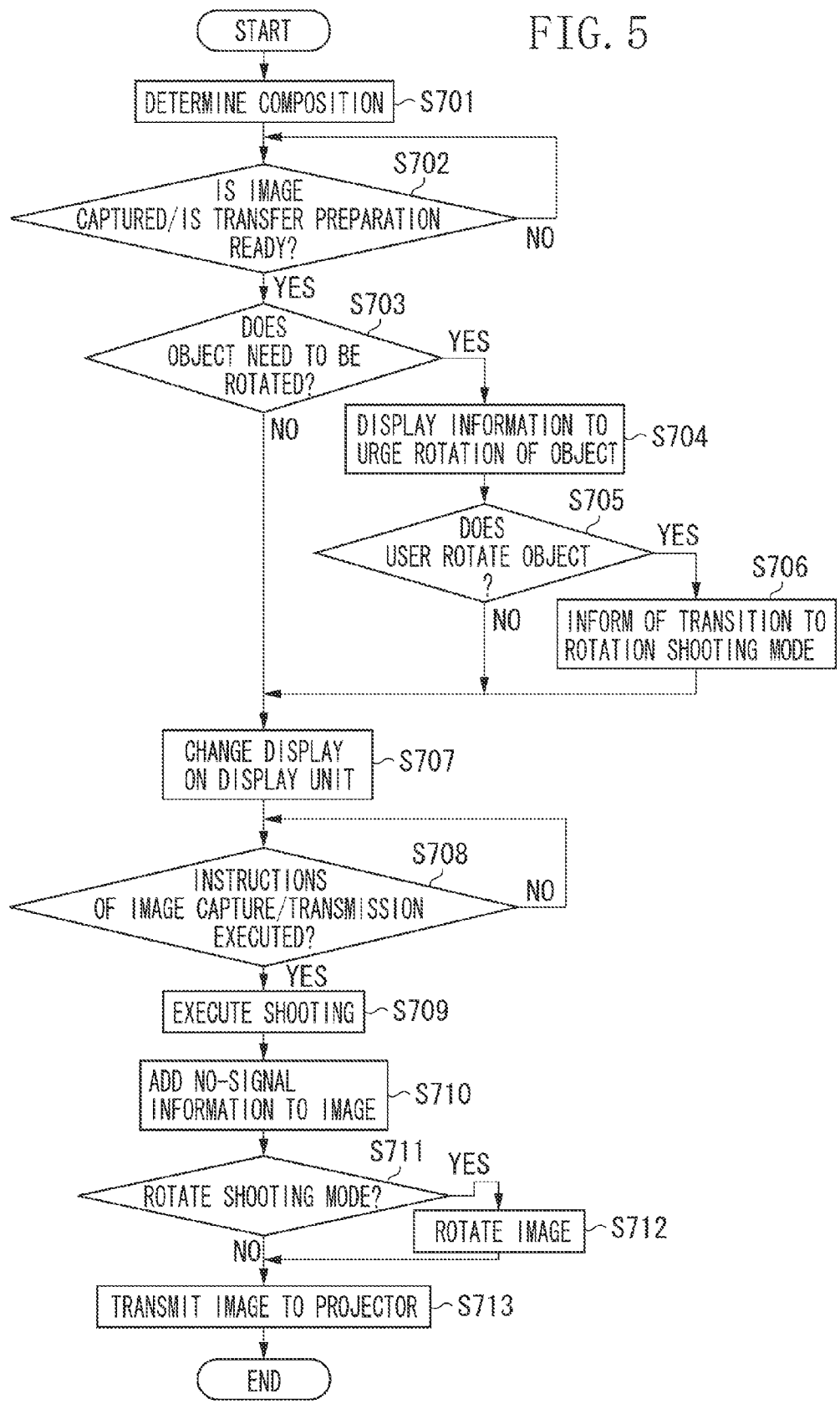

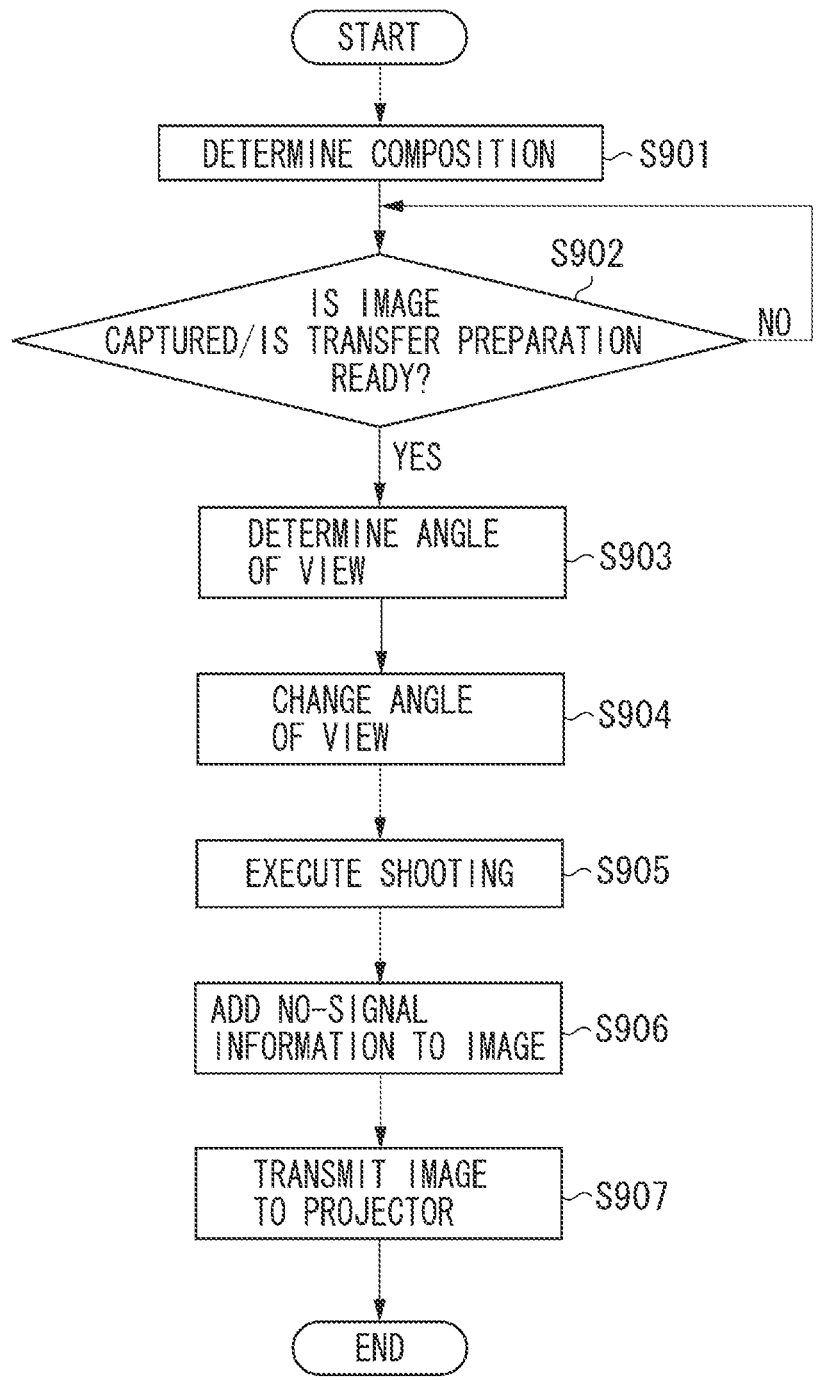

DISPLAY SYSTEM

BACKGROUND OF THE INVENTION

1. Field of the Invention

The present invention relates to a display system.

2. Description of the Related Art

Conventionally, an imaging apparatus is known in which a captured image is transferred to an output device and is printed/displayed. Further, a technique is known which changes an operation of an imaging apparatus based on information about an output device.

In Japanese Patent Application Laid-Open No. 2010-16552, a technique is discussed in which an imaging apparatus with a printing device overlaps a frame, which indicates the range of printing, with a captured image displayed on a liquid crystal display (LCD), in order to prevent a printed image from being cut due to a difference in an angle of view between shooting and printing.

In Japanese Patent Application Laid-Open No. 2010-16552, an imaging apparatus is discussed which changes resolution of an image to be captured corresponding to resolution of a display device externally connected.

Further, a display system in which an image captured by an imaging apparatus such as a document camera is transferred to a projection apparatus to be projected and displayed is also widely used in conference.

A projection apparatus sometimes needs to be projected being turned upward or downward from a position which does not frontally face the projection surface such as a screen when an installation place is limited or the projection apparatus is installed so as not to prevent visibility of an observer. Under such a situation, when an angle which an optical axis forms with the projection surface is different from the one set in advance or properly projectable angle, distortion occurs in an image displayed on the projection surface.

Such distortion of the projected image can be corrected in advance by executing distortion correction (trapezoid correction or keystone correction) on an image to be projected. However, this distortion correction processing is generally digital signal processing, which executes rearrangement of an image, including interpolation of a pixel and hence degrades the quality of the projected image.

When a captured image is projected by a projection apparatus, in a conventional technique, an imaging apparatus matches resolution with the projection apparatus to transfer an image to the projection apparatus. However, there is a problem that the degradation of the image quality due to the distortion correction processing in the projection apparatus cannot be avoided.

SUMMARY OF THE INVENTION

The present invention is directed to a display system, a projection apparatus, and an imaging apparatus that can solve the above problem when a captured image is projected by a projection apparatus.

According to an aspect of the present invention, the degradation of image quality can be reduced when executing distortion correction of an image to be projected by a projection apparatus.

According to another aspect of the present invention, a display system includes an imaging apparatus and a projection apparatus for projecting and displaying an image captured by the imaging apparatus, wherein the projection apparatus has a projection unit configured to project an image transmitted from the imaging apparatus onto a projection surface, a correction unit configured to correct distortion of an image to be projected on the projection surface, a generation unit configured to generate distortion information that indicates distortion of an image to be projected onto the projection surface, and a first transmission unit configured to transmit the distortion information to the imaging apparatus, and wherein the imaging apparatus has a receiving unit configured to receive the distortion information transmitted from the transmission unit of the projection apparatus, an imaging unit configured to shoot an object to capture an image of the object, a second transmission unit configured to transmit the image captured by the imaging unit to the projection apparatus, and a display unit configured to display the image captured by the imaging unit, the display unit displaying the image based on the received distortion information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a diagram illustrating a sequence according to the present exemplary embodiment.

FIG. 5 is a diagram illustrating another operation sequence after composition determination in an imaging apparatus according to the present exemplary embodiment.

FIG. 8 is a diagram illustrating another operation sequence after composition determination of a configuration illustrated in FIG. 7.

DESCRIPTION OF THE EMBODIMENTS

Various exemplary embodiments, features, and aspects of the invention will be described in detail below with reference to the drawings.

Figure 1:
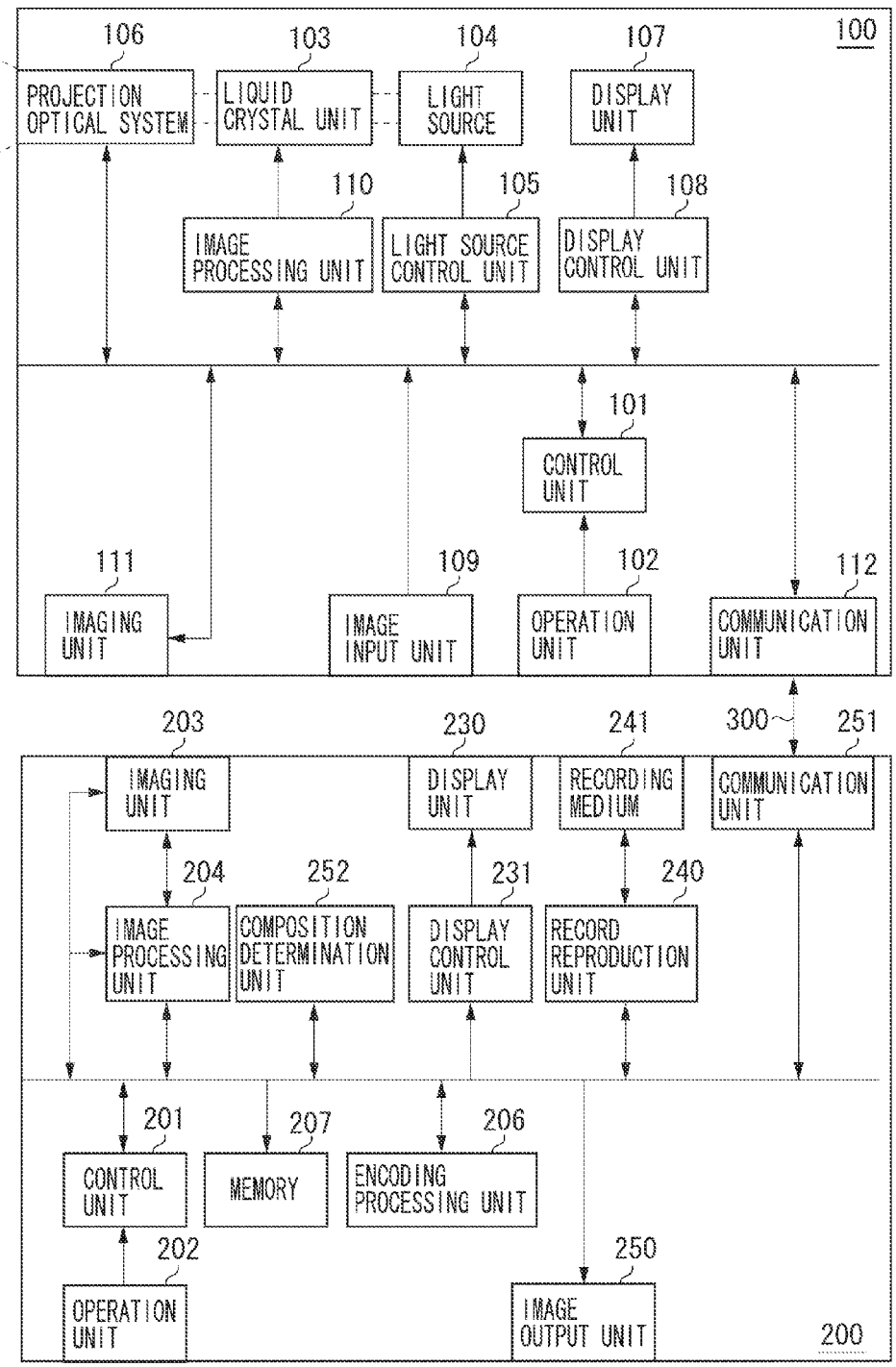
FIG. 1 is a block diagram illustrating a schematic configuration in an exemplary embodiment according to the present invention.

FIG. 1 is a block diagram illustrating a schematic configuration in an exemplary embodiment of a display system according to the present invention. The display system according to a first exemplary embodiment includes a mutually communicable projector (projection apparatus) 100 and imaging apparatus 200.

The configuration of the projector 100 will be described. A control unit 101 controls each block of the projector 100. An operation unit 102 receives an operation from a user. A liquid crystal unit 103 includes a liquid crystal driver that drives one or three liquid crystal display panels and a liquid crystal panel to display an image. A light source 104 illuminates the liquid crystal unit 103. A light source control unit 105 switches lighting/non-lighting of the light source 104 and adjusts the quantity of light. A projection optical system 106 includes a zoom lens, a shift lens, a focus lens, and the like to project an image formed on the liquid crystal panel on the projection surface (not illustrated).

A display unit 107 is disposed on a projector 100 main body to display the state, the warning, or the like of the projector. A display control unit 108 controls the display unit 107.

Into an image input unit 109, image data is input from outside. An image processing unit 110 processes image data input into the image input unit 109 to form an image on the liquid crystal panel in the liquid crystal unit 103. Image processing in the image processing unit 110 may include, for example, resolution conversion, rotation, gamma correction, distortion correction, and the like of an image.

An imaging unit 111 shoots in a direction of a screen (not illustrated) including the projection surface with the projection optical system 106.

A communication unit 112 is a unit to communicate with an external device. The projector 100 communicates with the imaging apparatus 200 through the communication unit 112. For example, the control unit 101 in the projector 100 transmits information (shooting composition determination information) for determining a shooting composition to the imaging apparatus 200 via the communication unit 112.

The configuration of the imaging apparatus 200 will be described. A control unit 201 controls each block of the imaging apparatus 200. An operation unit 202 receives an operation from a user. An imaging unit 203 includes a photographing lens and an image sensor which photo electrically converts an object optical image captured by the photographing lens to generate an image signal. An image processing unit 204 performs various types of image processing on an output image signal of the imaging unit 203. Further, the image processing unit 204 includes the function of adding no-signal information indicating a no-signal (e.g., information indicating black) to an arbitrarily pixel of an output image signal on the imaging unit 203. As will be described later in detail, when the projector 100 projects a captured image, the image processing unit 204 adds the no-signal information to a pixel in a non-projection region, whereby an image to be projected can be deformed into a rectangle beforehand.

An encoding processing unit 206 encodes an image signal captured by the imaging unit 203 and subjected to predetermined processing by the image processing unit 204. A memory 207 temporarily stores information set by a user, a captured image, and the like on the imaging apparatus 200. A display unit 230 displays information that indicates an output image on the imaging unit 203, the state of the imaging apparatus 200, and the like. The control unit 201 controls the display unit 230.

A recording medium 241 is detachably attached to the imaging apparatus 200. The recording medium 241 mainly records the captured image data. A record reproduction unit 240 controls recording/reading of image data in or from the recording medium 241.

An image output unit 250 outputs an output image signal from the imaging unit 203, an output image signal from the image processing unit 204, an image signal stored in the memory 207, and an image signal read from the recording medium 241, to an external device.

A communication unit 251 communicates with an external device, in the present case with the projector 100 in FIG. 1. The control unit 201 in the imaging apparatus 200 requires shooting composition determination information from the projector 100 via the communication unit 251.

A composition determination unit 252 determines a shooting composition in response to the shooting composition determination information from the projector 100. The detail will be described later.

Figure 2:
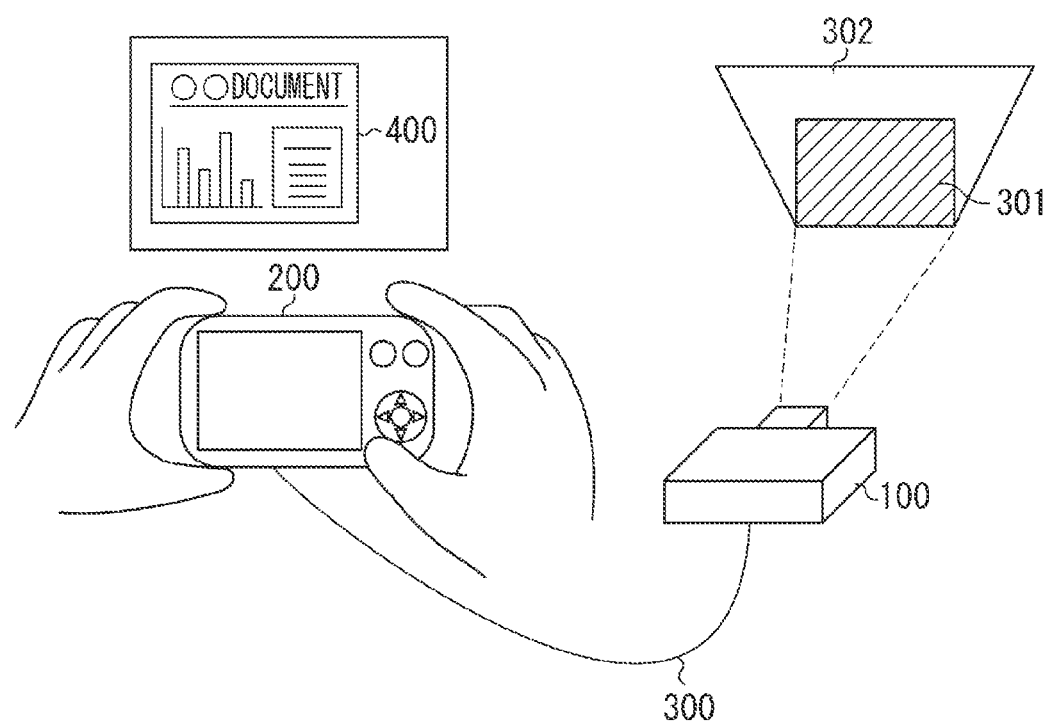
FIG. 2 is a schematic diagram illustrating a relationship between a shooting object and a projected image according to the present exemplary embodiment.

Referring to FIG. 2, the contents of the shooting composition determination information will be described. FIG. 2 illustrates a relationship between an object and an image to be projected and displayed by the projector 100 when the present exemplary embodiment is employed.

The communication unit 112 in the projector 100 and the communication unit 251 in the imaging apparatus 200 are connected via a wired or wireless connection unit 300 to communicate mutual device information. Further, the imaging apparatus 200 transmits captured image data to the projector 100. The projector 100 transmits the above-described shooting composition determination information to the imaging apparatus 200. The image output unit 250 in the imaging apparatus 200 is connected to the image input unit 109 in the projector 100.

As illustrated in FIG. 2, an image display region projected and displayed after an image to be projected from the projector 100 is subjected to distortion correction to have a rectangle shape is a valid image region 301. Further, a region, which is located around the valid image region 301, where an image is not displayed due to distortion correction is an invalid image region 302. This invalid image region 302 is a region where an image is projected when the projector 100 does not execute distortion correction.

The shooting composition determination information is information concerning distortion of an image to be projected or distortion correction of a projected image executed by the projector 100. The shooting composition determination information only needs to enable distinguishing of the valid image region 301 from the invalid image region 302.

Projected image distortion information includes information about the tilt angle of the projector 100, information about a projection optical system, and information about the installation condition and display resolution of the projector 100. The information about the projection optical system includes the condition of a zoom lens and a shift lens in the projection optical system 106, and a projection angle of projection light. The installation condition of the projector 100 is, for example, that it is hung from a ceiling (rotate 180 degrees) or installed on the ground.

Distortion correction information is information concerning distortion correction in the image processing unit 110 in the projector 100. For example, the distortion correction information is coordinates information of four corners of a projected image subjected to distortion correction on a panel in the liquid crystal unit 103, in other words, information about a display position. Further, the distortion correction information may also be a value set by a user to distortion correction processing. The distortion correction information may be information corresponding to a shape of a projected image after distortion correction.

In this case, the value set by the user in the image processing unit 110 of the projector 100 and a corresponding table (look up table (LUT)) concerning coordinates of four corners of a projected image after distortion correction are stored in the memory 207. The control unit 201 searches the corresponding table using the value set by the user to distortion correction processing from the projector 100 to obtain coordinates of four corners of the projected image after distortion correction of the projector 100 is performed. Thus, the imaging apparatus 200 can quantitatively find distortion correction in the projector 100.

Figure 4A:
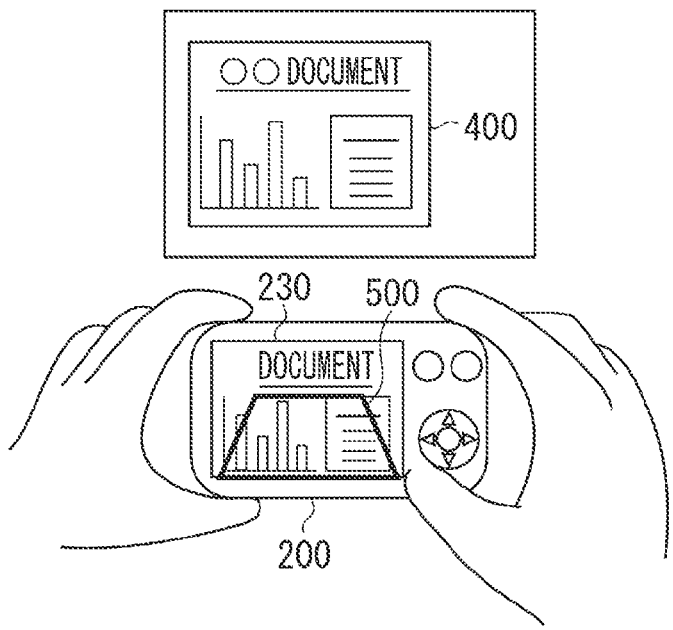
FIGS. 4A, 4B, and 4C are examples of images on an imaging apparatus according to the present exemplary embodiment.

The composition determination unit 252 determines a region corresponding to the valid image region 301 and the invalid image region 302 when projected by the projector 100 in the image captured by the imaging unit 203 based on the shooting composition determination information. The composition determination unit 252 generates composition information to indicate a frame line which illustrates the edge of the valid image region 301 when the captured image is projected by the projector 100 to transmit it to a display control unit 231. The display control unit 231 generates an image on the frame line according to composition information from the composition determination unit 252 to display it on the display unit 230 being superposed on the captured image. FIG. 4A illustrates a display example on the display unit 230 at this time. A trapezoidal frame line 500 illustrated in FIG. 4A is generated and displayed according to composition information. Other than the frame line which illustrates the edge of the valid image region 301, a region corresponding to the invalid image region 302 may be painted with a specific color, black for example, or luminance may evenly be reduced. Point is that the region corresponding to the valid image region 301 and the region corresponding to the invalid image region 302 can be discriminated by a user. A document 400 in FIG. 4 is a shooting target document which is placed on a desk or the like.

FIG. 3 illustrates an operation flowchart according to the present exemplary embodiment. Referring to FIG. 3, an operation in the present exemplary embodiment will be described.

In step S401, a user connects the projector 100 and the imaging apparatus 200. In step S401, when the projector 100 and the imaging apparatus 200 are connected, in step S402, communication is established.

In step S402, when communication is established, in step S403, the control unit 201 determines whether a device connected through the communication unit 251 is a projector. If the control unit 201 determines that the connected device is a projector (YES in step S403), in step S404, the control unit 201 requires the connected projector 100 to transmit the shooting composition determination information. On the other hand, if the control unit 201 determines that the connected device is other than a projector (NO in step S403), processing in steps S406 to S408 is not executed. In this case, the control unit 201 waits for shooting instructions from an operator.

In step S404, when a transmission request of the shooting composition determination information is received from the imaging apparatus 200, in step S405, the control unit 101 in the projector 100 transmits the shooting composition determination information to the imaging apparatus 200 through the communication unit 112. The control unit 101 in the projector 100 waits for input of image data into the image input unit 109.

In step S405, when the shooting composition determination information is received, in step S406, the composition determination unit 252 on the imaging apparatus 200 determines a composition based on the shooting composition determination information to generate composition information.

In step S407, the control unit 201 waits until the imaging apparatus 200 completes shooting and transmitting of a captured image to the projector 100 is ready. For example, when the imaging apparatus 200 has two types of operation modes of a shooting mode and a display mode that displays a captured image, if the shooting mode is turned on, it is determined that the preparation is completed.

If the control unit 201 determines that preparation for capturing an image by the imaging apparatus 200/transmission is completed (YES in step S407), in step S408, the composition determination unit 252 transmits the composition information to the display control unit 231 and the display control unit 231 changes display on the display unit 230 based on the composition information. In other words, as illustrated in FIG. 4A, the display unit 230 displays the trapezoidal frame line 500 which represents a boundary between the region corresponding to the valid image region 301 and the region corresponding to the invalid image region 302, with the trapezoidal frame line 500 overlapping with the captured image.

Figure 4B:
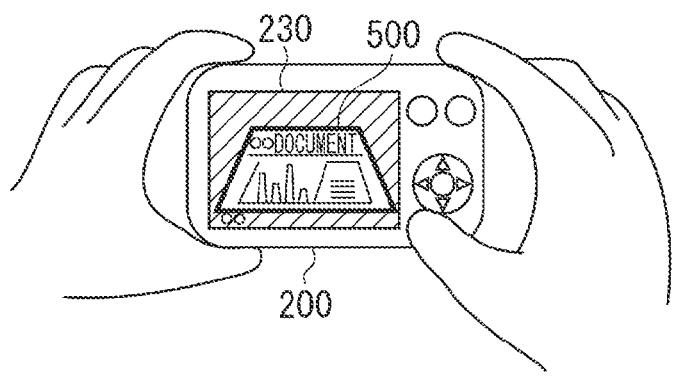

In step S409, the user of the imaging apparatus 200 determines a shooting composition performed by the imaging apparatus 200 corresponding to the contents of display on the display unit 230. For example, the imaging apparatus 200 is tilted to an object such that an object intended to be projected and displayed falls within the trapezoidal frame line 500 displayed on the display unit 230 as illustrated in FIG. 4B.

Figure 4C:
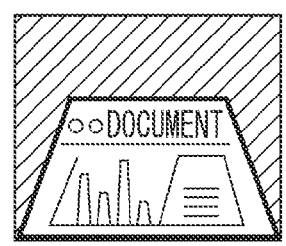

Next, in step S410, the user on the imaging apparatus 200 operates the operation unit 202 to instruct the imaging apparatus 200 to execute shooting and transmit captured image data to the projector 100. In step S411, the control unit 201 causes the imaging unit 203 to execute shooting according to instructions to execute shooting and transfer an image from the user. In step S412, the image processing unit 204 replaces a signal of a pixel corresponding to the region which becomes the invalid image region 302 of the captured image with no-signal information (e.g., black) according to the composition information from the composition determination unit 252. At this time, the captured image is provided as illustrated in FIG. 4C.

The image processing unit 204 supplies the captured image data with the no-signal information added, to an image output unit 250. In step S413, the image output unit 250 transmits it to the projector 100.

In step S414, when detecting input of an image into the image input unit 109, the control unit 101 in the projector 100 determines whether the image data is transmitted from the imaging apparatus 200. For example, as long as communication established in step S402 is not cut off, the control unit 101 may determine that the input image data is transmitted from the imaging apparatus 200. Further, for example, when the projector 100 includes a plurality of image input units 109, the user may set or designate the image input unit 109 which is to be connected with the imaging apparatus 200 in advance.

If it is determined that the input image data into the image input unit 109 is transmitted from the imaging apparatus 200 (YES in step S414), the control unit 101 instructs the image processing unit 110 to cancel distortion correction processing of the image. In step S415, under the instructions received from the control unit 101, the image processing unit 110 cancels the distortion correction processing and outputs data from the image input unit 109 to the liquid crystal unit 103 without executing the distortion correction processing. In step S416, thus the image of image data from the imaging apparatus 200 is formed in the liquid crystal unit 103 and projected on the projection surface.

At the stage of shooting by the imaging apparatus 200, an object is shot with deformation so as to dissolve trapezoidal distortion in projection by the projector 100 beforehand. Thus, the distortion correction processing in the projector 100 is not needed. The distortion correction processing is generally accompanied with major degradation of image quality. However, in the present exemplary embodiment, this degradation can be omitted. Accordingly, it can be expected that image quality is significantly improved compared with the conventional example.

When a composition is determined for the imaging apparatus 200, the object 400 intended to be shot is displayed on the display unit 230 as it is and the frame line 500 is displayed being superposed thereon. As another method, the image of the object 400 may be subjected to deformation that simulates deformation due to projection by the projector 100 and displayed on the display unit 230. This allows the user to visually confirm a state projected and displayed by the projector 100, on the screen of the display unit 230. Specifically, when the user half presses a shutter button on the operation unit 202, the control unit 201 instructs the image processing unit 204 to deform the region corresponding to the valid image region 301 among output images from the imaging unit 203 into a rectangle. For such an image deformation method, a known geometric deformation method such as projective transformation is used. The display control unit 231 displays an image deformed by the image processing unit 204 on the display unit 230.

When it is determined to connect with the projector 100 (YES in step S403), the imaging apparatus 200 requires to transmit the shooting composition determination information to the projector 100. However, timing of an information request is not limited to this. For example, when it is determined that shooting is ready, information may be required. Further, before the user determines the composition, the composition determination unit 252 may determine the composition, and the display unit 230 may display, for example, a trapezoidal frame that represents a boundary between the valid image region 301 and the invalid image region 302, or the like.

It is obvious that a direction and an extent in which an object is tilted and shot using the imaging apparatus 200 depend on the direction and the extent of a tilt of the projector 100 to the projection surface. Depending on circumstances of a shooting operation, an object image displayed on the display unit 230 is vertically reversed. Thus, it may be difficult to confirm the composition. Such a problem can be solved by changing an operation of the imaging apparatus 200 after step S406 in FIG. 3 into an operation illustrated in FIG. 5.

In step S701, the composition determination unit 252 generates composition information based on shooting composition determination information. In step S702, the control unit 201 waits until shooting by the imaging apparatus 200 and transmitting of captured image data to the projector 100 is ready. If shooting and transmission of the captured image data is ready (YES in step S702), in step S703, the composition determination unit 252 determines whether an object needs to be rotated from the composition information determined in Step S701. For example, when the region corresponding to the valid image region 301 in the captured image has a trapezoidal shape having a short lower side, the composition determination unit 252 determines that the object needs to be rotated 180 degrees. Conversely, when it is determined that the boundary has a trapezoidal shape having a short upper side, it is determined that rotation of the object is not needed.

If the composition determination unit 252 determines that the object does not need to be rotated (NO in step S703), the processing proceeds to step S707.

Figure 6A:
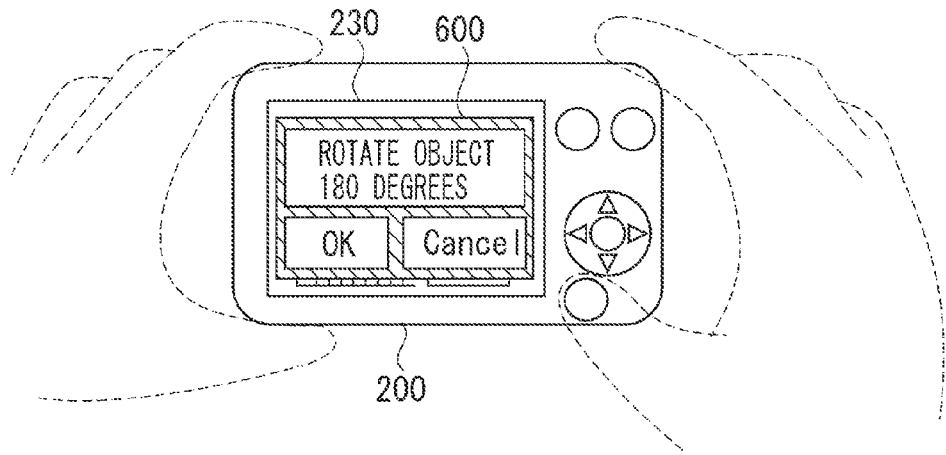
FIGS. 6A, 6B, and 6C are examples of images in an imaging apparatus in a sequence illustrated in FIG. 5.

If the composition determination unit 252 determines that the object needs to be rotated (YES in step S703), in step S704, the composition determination unit 252 instructs the display control unit 231 to display a message 600 to urge rotation of the object as illustrated in FIG. 6A on the display unit 230. In step S705, the control unit 201 determines whether the user rotates the object as instructed. Specifically, as illustrated in FIG. 6A, an option may be displayed on the display unit 230 and confirmed by the user.

If the user does not rotate the object (NO in step S705), the processing proceeds to step S707. On the other hand if the user rotates the object (YES in step S705), in step S706, the control unit 201 shifts to a rotation shooting mode and informs the composition determination unit 252 of transition to the rotation shooting mode. Then, the processing proceeds to step S707.

Figure 6B:
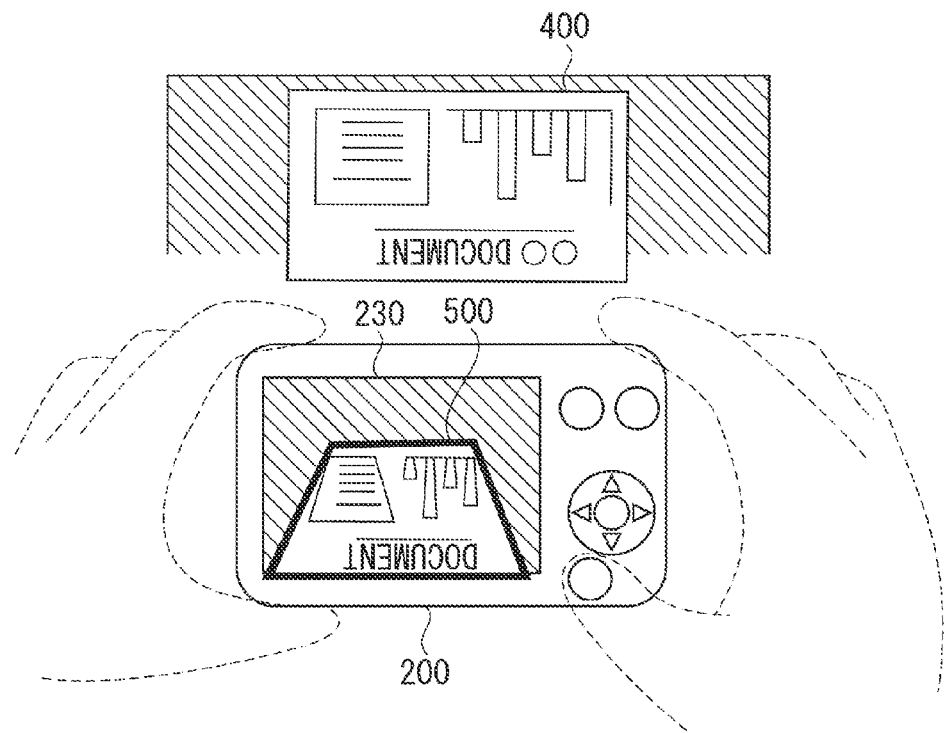

In step S707, the composition determination unit 252 instructs the display control unit 231 to display the trapezoidal frame 500, for example, as illustrated in FIG. 6B. At this time, in a case of a rotation shooting mode, the composition determination unit 252 instructs the display control unit 231 to display the trapezoidal frame 500, which is rotated similarly to the rotation angle of the object determined in step S704.

In step S708, the control unit 201 waits for shooting instructions from the user. In step S709, when the control unit 201 receives shooting instructions from the operation unit 202, the control unit 201 issues shooting instructions to the imaging unit 203.

In step S710, the image processing unit 204 replaces a signal of a pixel corresponding to the region which becomes the invalid image region 302 among image data captured in step S709 with no-signal information based on the composition information from the composition determination unit 252.

Figure 6C:
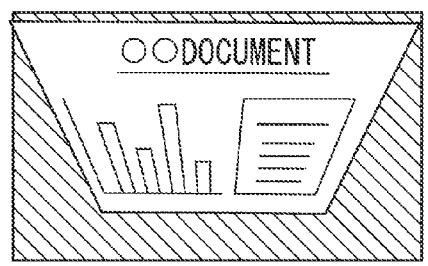

If the control unit 201 is not in the rotation shooting mode (NO in step S711), the processing proceeds to step S713. If the control unit 201 is in the rotation shooting mode (YES in step S711), in step S712, the control unit 201 instructs the image processing unit 204 to rotate an image in a reverse direction to a rotation angle instructed to the user in step S703, at the same angle. An example of the captured image rotated in the image processing unit 204 is illustrated in FIG. 6C.

In step S7134, the image data rotated in the image processing unit 204 is transmitted to the projector 100 through the image output unit 250.

The operation described referring to FIG. 5 enables the user to shoot the object without turning the imaging apparatus 200 in a direction of the user herself/himself. This allows the user to easily confirm display on the display unit and to facilitate shooting.

Figure 7:
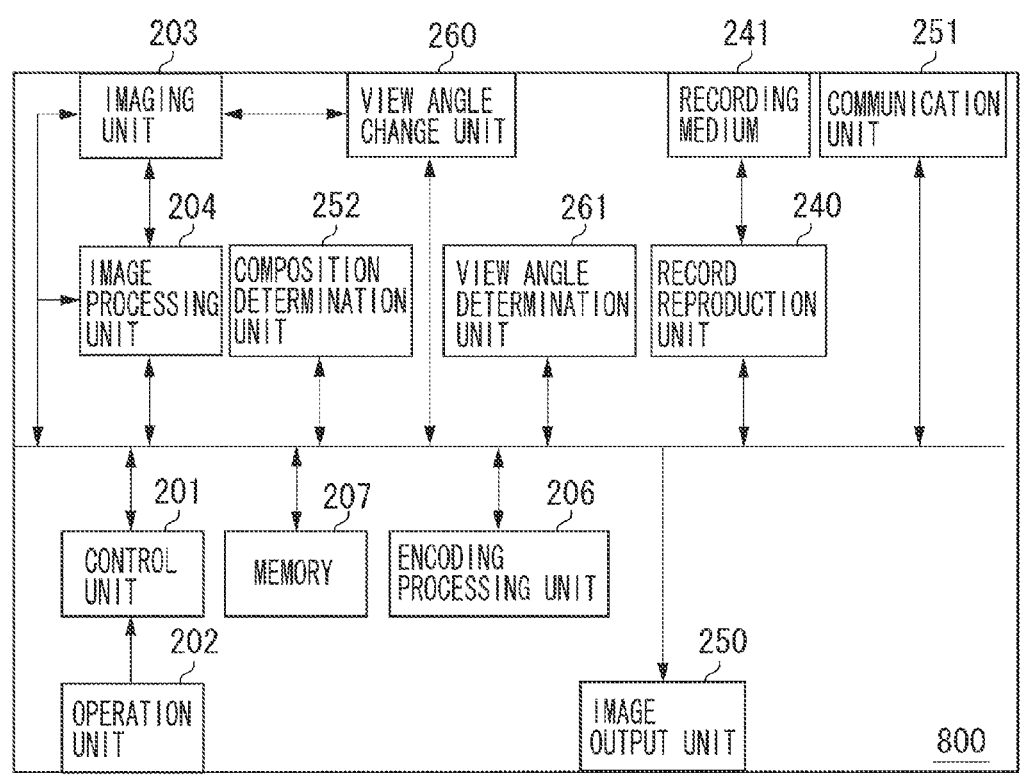
FIG. 7 is a block diagram illustrating a schematic configuration that indicates another configuration of an imaging apparatus according to the present exemplary embodiment.

A second exemplary embodiment will be described below. FIG. 7 is a block diagram illustrating another schematic configuration of an imaging apparatus. An imaging apparatus 800 illustrated in FIG. 7 is configured such that the display unit 230 and the display control unit 231 are removed from the imaging apparatus 200 in FIG. 1 and a view angle change unit 260 and a view angle determination unit 261 are added. The component having the function similar to the imaging apparatus 200 illustrated in FIG. 1 is affixed with the same reference numeral.

The view angle determination unit 261 determines the angle of view of the imaging unit 203 based on composition information generated by the composition determination unit 252. It is preferable that the angle of view to be determined by the view angle determination unit 261 is an angle of view in which an object falls within the region corresponding to the valid image region 301 when the captured image is projected by the projector 100.

The view angle change unit 260 changes the angle of view of the imaging unit 203, thereby controlling the composition of an image to be captured by the imaging unit 203. The view angle change unit 260 may also include a mechanism such as a movable arm that supports the imaging unit 203 and a mechanism to rotate the imaging unit 203. The view angle change unit 260 operates these mechanisms according to view angle information instructed from the view angle determination unit 261 to change the angle of view of the imaging unit 203.

Similarly to the first exemplary embodiment, the imaging apparatus 800 is connected to the projector 100 by a wired or wireless connection unit 300 to communicate mutual device information and captured images by the imaging apparatus 800.

FIG. 8 illustrates an operation flowchart of the imaging apparatus 800 after step S406. In step S901, the composition determination unit 252 generates composition information based on shooting composition determination information. In step S902, the imaging unit 201 waits until shooting by the imaging apparatus 200 and transmitting of captured image data to the projector 100 are ready. If the control unit 201 determines that image capture/transmission is ready (YES in step S902), in step S903, the view angle determination unit 261 determines the angle of view of the imaging unit 203.

In step S904, the view angle determination unit 261 instructs the view angle change unit 260 to change the angle of view of the imaging unit 203 to an angle of view determined in step S903. In step S905, the imaging unit 203 shoots the object after a change in the angle of view is completed.

In step S906, the image processing unit 204 replaces a signal of a pixel corresponding to the region which becomes the invalid image region 302 of the image captured in step S905 with no-signal information based on the composition information from the composition determination unit 252.

In step S907, the image output unit 250 transmits the captured image data processed in the image processing unit 204 to the projector 100.

Such an operation allows the imaging apparatus 800 to shoot the object in a size suitable for projection by the projector 100 and allows the projector 100 to project the captured image in a large size despite trapezoidal distortion.

The purpose of the present invention can also be achieved by supplying a storage medium recording a program code of software that realizes the function of the above-described exemplary embodiment to an apparatus. At this time, a computer (or central processing unit (CPU) or micro processing unit (MPU)), containing a control unit of the apparatus to which the storage medium is supplied, reads and executes the program code stored in the storage medium. The execution of the program code read from the storage medium realizes the functions of the above-described exemplary embodiment. The storage medium storing the program code is an embodiment of the present invention.

As the storage medium for supplying the program code, for example, a magnetic disk, a hard disk, an optical disk, a magneto-optical disk, a compact disc read only memory (CD-ROM), a compact disc-recordable (CD-R), a magnetic tape, a nonvolatile memory card, a read only memory (ROM), or the like can be used.

The present invention includes also a case in which an operating system (OS) operating on an apparatus executes a part or the whole of the processing based under the instructions of the above-described program code or the like, and the function of the above-described exemplary embodiment is realized by the processing.

Further, the present invention includes also a case in which the program code read from the storage medium is written into a memory provided on a function expansion board inserted into an apparatus or a function expansion unit connected to a computer, and the function of the above-described exemplary embodiment is realized. In this case, a CPU or the like provided on the function expansion board or the function expansion unit executes a part or the whole of the actual processing based on the instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-154321 filed Jul. 6, 2010, which is hereby incorporated by reference herein in its entirety.

What is claimed is:

1. A display system comprising:
    an imaging apparatus; and
    a projection apparatus that projects an image captured by the imaging apparatus,
    wherein the projection apparatus includes
    a projection unit configured to project an image transmitted from the imaging apparatus onto a projection surface,
    a generation unit configured to generate distortion information that indicates distortion of an image to be projected onto the projection surface, and
    a first transmission unit configured to transmit the distortion information to the imaging apparatus, and
    wherein the imaging apparatus includes
    a receiving unit configured to receive the distortion information transmitted from the first transmission unit of the projection apparatus,
    an imaging unit configured to capture an image of an object,
    a second transmission unit configured to transmit the image captured by the imaging unit to the projection apparatus, and
    a display unit configured to display a predetermined image based on the distortion information and the image captured by the imaging unit.

2. The display system according to claim 1, wherein the second transmission unit transmits a specific image captured by the imaging apparatus to the projection apparatus while the display unit displays an image based on the distortion information.

3. A projection apparatus comprising:
    a projection unit configured to project an input image on a projection surface;
    a communication unit configured to communicate with an external imaging apparatus, the external imaging apparatus capturing an image and transmitting the captured image to the projection apparatus; and
    a control unit configured to control the correction unit, wherein the control unit controls the communication unit to transmit distortion information, concerning distortion of an image to be projected on the projection surface by the projection unit, to the external imaging apparatus.

4. The projection apparatus according to claim 3, wherein the control unit determines whether the input image is a specific image, which is captured with deformation for dissolving distortion in projection by the projection unit, received from the external imaging apparatus after transmitting the distortion information, and if it is determined that the input image is the specific image from the external imaging apparatus, the control unit controls the projection unit to project the specific image received from the external imaging apparatus without distortion correction.

5. The projection apparatus according to claim 3, wherein the distortion information includes any of information which indicates a tilt angle to the projection surface, a state of a projection optical system of the projection unit, display resolution of the display panel of the projection unit, and whether the projection apparatus is in a state of being hung from a ceiling.

6. The projection apparatus according to claim 3, wherein the distortion information includes either of a user set value to correct distortion of an image to be projected on the projection surface by the projection unit, and display position information about an image on the display panel of the projection unit after distortion of the image to be projected on the projection surface by the projection unit is corrected.

* * * * *